(12) United States Patent
Klatt et al.

(10) Patent No.: US 11,151,898 B1
(45) Date of Patent: Oct. 19, 2021

(54) TECHNIQUES FOR ENHANCING WORKFLOWS RELATING TO EQUIPMENT MAINTENANCE

(71) Applicant: Klatt Works, Inc., Pleasanton, CA (US)

(72) Inventors: Nathan D. Klatt, Dublin, CA (US); John David Slack, Las Vegas, NV (US); Divya Prasannan, Dublin, CA (US); Vinod Krishnankutty, Dublin, CA (US); Edward F. Riehle, Elk Grove, CA (US)

(73) Assignee: Klatt Works, Inc., Pleasanton, CA (US)

( * ) Notice: Subject to any disclaimer, the term of this patent is extended or adjusted under 35 U.S.C. 154(b) by 0 days.

(21) Appl. No.: 17/105,048

(22) Filed: Nov. 25, 2020

Related U.S. Application Data

(60) Provisional application No. 63/010,372, filed on Apr. 15, 2020.

(51) Int. Cl.
*G09B 19/00* (2006.01)
*G06F 3/0482* (2013.01)
(Continued)

(52) U.S. Cl.
CPC ....... *G09B 19/003* (2013.01); *G02B 27/0172* (2013.01); *G06F 1/163* (2013.01);
(Continued)

(58) Field of Classification Search
CPC ....... G09B 19/003; G09B 5/065; G06F 1/163; G06F 21/36; G06F 3/167; G06F 3/012;
(Continued)

(56) References Cited

U.S. PATENT DOCUMENTS

| 5,488,508 A | * | 1/1996 | Haseltine | G02B 27/0172 |
| | | | | 359/227 |
| 6,567,079 B1 | * | 5/2003 | Smailagic | G06F 1/163 |
| | | | | 345/156 |

(Continued)

FOREIGN PATENT DOCUMENTS

| EP | 3173745 A1 * | 5/2017 | ........... G06T 1/0007 |
| JP | 2002297966 A * | 10/2002 | |

*Primary Examiner* — David D Davis
(74) *Attorney, Agent, or Firm* — Schwegman Lundberg & Woessner, P.A.

(57) ABSTRACT

The present application describes a technique for enhancing an electronic version of a maintenance manual or procedure with an interactive workflow, and presenting the enhanced electronic document using mobile computing devices that can be operated easily hands-free. The workflow primarily consists of a set of interactive checklist items that a maintenance specialist can mark complete via a spoken command. The enhanced electronic documents are additionally associated with supplemental multimedia content, presented contextually based on the currently selected and active checklist item. Furthermore, the document viewing application provides for integrated reporting functionality, enabling a maintenance specialist to capture relevant information during the maintenance procedure, for subsequent use in generating and submitting a report either electronically or via hard copy. The mobile computing devices on which the electronic documents are presented additionally provide on-site maintenance specialists with the ability to establish telepresence sessions and otherwise communicate with remote maintenance specialists.

27 Claims, 10 Drawing Sheets

(51) Int. Cl.
*G06F 3/16* (2006.01)
*H04N 5/76* (2006.01)
*G06F 3/01* (2006.01)
*G06F 3/0488* (2013.01)
*G06F 21/36* (2013.01)
*G06F 1/16* (2006.01)
*G02B 27/01* (2006.01)
*G09B 5/06* (2006.01)

(52) U.S. Cl.
CPC ............ *G06F 3/012* (2013.01); *G06F 3/0482* (2013.01); *G06F 3/0488* (2013.01); *G06F 3/167* (2013.01); *G06F 21/36* (2013.01); *G09B 5/065* (2013.01); *H04N 5/76* (2013.01); *G02B 2027/014* (2013.01); *G02B 2027/0138* (2013.01); *G02B 2027/0141* (2013.01)

(58) Field of Classification Search
CPC ....... G06F 3/0482; G06F 3/0488; H04N 5/76; G02B 27/0172; G02B 2027/0141; G02B 2027/0138; G02B 2027/014
See application file for complete search history.

(56) References Cited

U.S. PATENT DOCUMENTS

| | | | | |
|---|---|---|---|---|
| 2002/0155417 | A1* | 10/2002 | Browne | G09B 19/0038 434/257 |
| 2009/0202221 | A1* | 8/2009 | Guo | H04N 7/17318 386/343 |
| 2012/0075168 | A1* | 3/2012 | Osterhout | G06F 3/011 345/8 |
| 2015/0302651 | A1* | 10/2015 | Shpigelman | G02B 27/0172 345/633 |
| 2016/0019423 | A1* | 1/2016 | Ortiz | G02B 27/017 345/633 |
| 2017/0011254 | A1* | 1/2017 | Guo | G06F 16/5838 |
| 2017/0061212 | A1* | 3/2017 | Tanaka | G02B 27/0179 |
| 2017/0193302 | A1* | 7/2017 | Mullins | G09G 5/006 |
| 2017/0195629 | A1* | 7/2017 | Wexler | G06F 16/583 |
| 2017/0213390 | A1* | 7/2017 | Ramachandran | G06F 3/011 |
| 2018/0114288 | A1* | 4/2018 | Aldaz | G06Q 10/10 |
| 2019/0312985 | A1* | 10/2019 | Yeap | G06K 9/3208 |
| 2020/0137665 | A1* | 4/2020 | Judi | G06F 1/163 |
| 2020/0142388 | A1* | 5/2020 | Maggiore | H04W 4/33 |

* cited by examiner

TECHNIQUES FOR ENHANCING WORKFLOWS RELATING TO EQUIPMENT MAINTENANCE

RELATED APPLICATIONS

This patent application claims a priority benefit to U.S. Provisional patent application No. 63/010,372, entitled "TECHNIQUES FOR ENHANCING WORKFLOWS RELATING TO EQUIPMENT MAINTENANCE," filed on Apr. 15, 2020, which is incorporated herein by reference in its entirety.

TECHNICAL FIELD

The present application relates generally to the technical field of data processing and presentation techniques, and, more specifically, to techniques for using mobile computing devices that can be operated easily hands-free to present electronic versions of maintenance manuals that have been enhanced with interactive workflows.

BACKGROUND

Equipment maintenance generally relates to any process utilized in keeping an organization's equipment in reliable working order. It may include routine inspection and upkeep, as well as corrective repair work. In some instances, such as with aircraft, equipment maintenance is highly regulated in order to ensure correct functioning and public safety. For example, aircraft maintenance specialists generally require extensive training and must be authorized—in some cases, licensed—for the tasks that they carry out. Aircraft maintenance procedures are frequently subject to detailed maintenance reporting requirements, which can be extremely time consuming for the aircraft maintenance specialists.

Most equipment that is manufactured and sold, including aircraft, is accompanied by some sort of maintenance manual that provides details on how the equipment is to be maintained. In many instances, maintenance manuals are subject to some system of version control, such that any minor differences in a particular part, or model of equipment, will necessitate a particular version of the maintenance manual. As illustrated in FIG. 1, in the case of aircraft and military aircraft in particular, maintenance manuals tend to be stored on military grade, rugged, laptop computers, allowing aircraft maintenance specialists to access the maintenance manuals in the field. However, this leads to a variety of problems in the field. For example, the size and weight of these special laptops makes them difficult to handle in the field, particularly while performing maintenance actions that frequently occur in confined spaces in and around the aircraft. Because laptops use keyboards and trackpads as a primary means of receiving end-user input, retrieving relevant information and navigating the electronic documents via the laptop requires a significant amount of time, concentration and effort that might better be spent on the maintenance procedure.

BRIEF DESCRIPTION OF THE DRAWINGS

Some embodiments of the present invention are illustrated by way of example and not limitation in the figures of the accompanying drawings, in which like reference numbers indicate similar elements, and in which.

DETAILED DESCRIPTION

Described herein are methods and systems for generating and presenting enhanced electronic documents with workflows relating to the maintenance of equipment, wherein presentation and navigation of the enhanced electronic documents occurs using mobile computing devices that in some instances can be operated easily hands-free. Specifically, the present disclosure describes techniques for presenting, via a head-mounted display, electronic documents that provide detailed instructions regarding the maintenance of equipment, and which have been enhanced with a workflow consisting of a plurality of interactive checklist items for keeping track of the progress of a maintenance procedure. In the following description, for purposes of explanation, numerous specific details and features are set forth in order to provide a thorough understanding of the various aspects of different embodiments of the present invention. It will be evident, however, to one skilled in the art, that the present invention may be practiced with varying combinations of the many details and features described herein.

Figure 1:
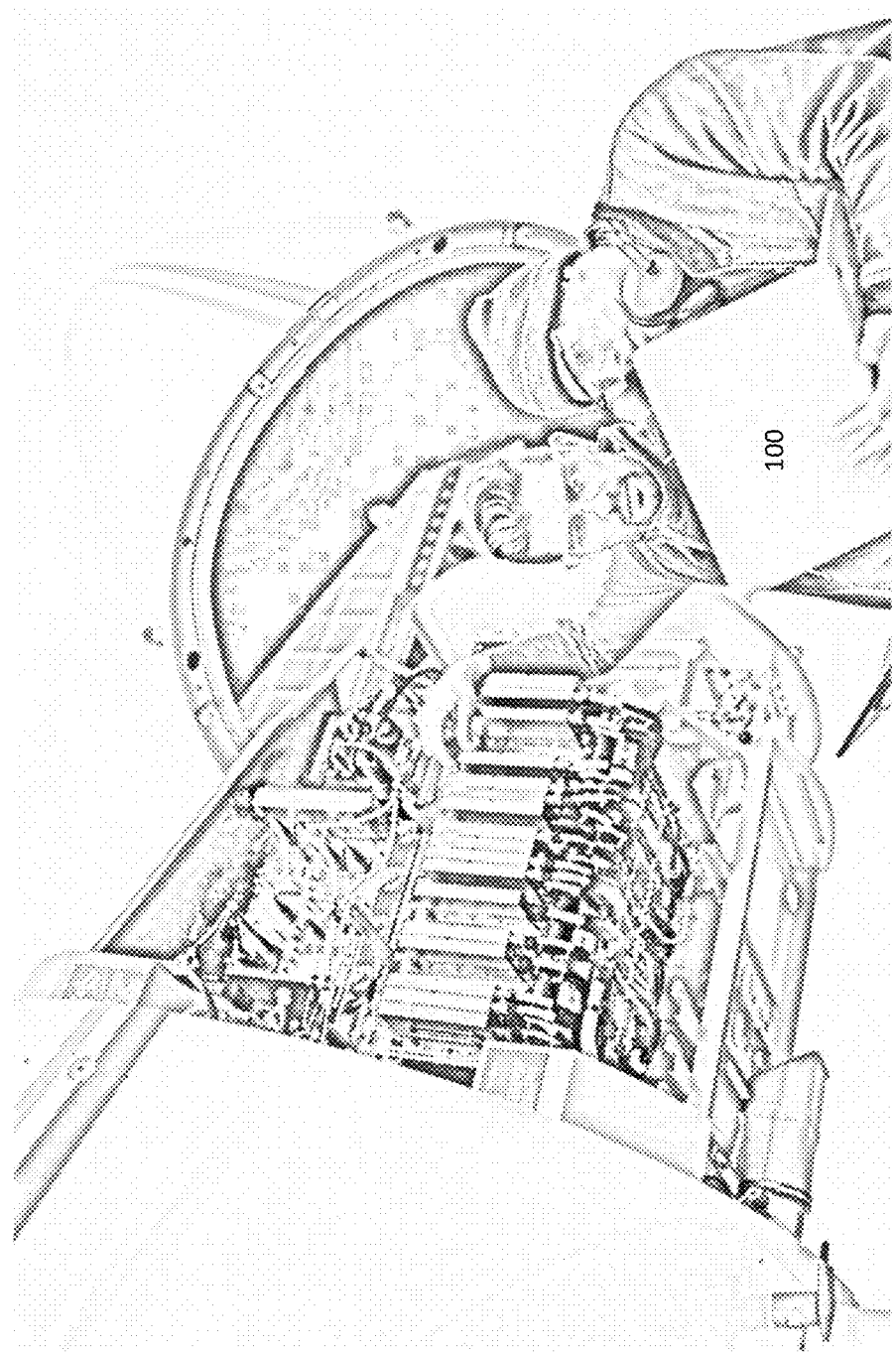
FIG. 1 illustrates a typical example of an environment in which aircraft maintenance might be performed, utilizing a conventional military grade laptop computer.

Conventionally, maintenance manuals with instructions and illustrations relating to the maintenance of equipment are made available to maintenance specialists as electronic documents via mobile computing devices, such as laptop computers. While this allows the maintenance specialists to access the maintenance manuals in the field where the maintenance procedures are performed, the task of operating the laptop to view and navigate the maintenance manual often gets in the way of the maintenance procedure. For example, accessing the electronic document on a laptop generally will require that the maintenance specialist use some combination of a keyboard and track pad (or other hand-operated input device). Furthermore, to conveniently access the laptop, the laptop will typically need to be placed on some raised surface, such as a table or laptop stand. For a variety of reasons, in the field, there will frequently be no such raised surface where a laptop can be placed for easy access and operation. Accordingly, as illustrated in FIG. 1, operating a laptop 100 to access electronic versions of maintenance manuals during a maintenance procedure is not an ideal situation.

In addition to problems stemming from the device (e.g., a laptop) from which the maintenance manual may be accessed, in some instances the maintenance manuals themselves may not be perfect. For example, a particular maintenance procedure described and illustrated in a maintenance manual may be complicated, such that it is not easy to precisely convey the necessary steps to be completed via text and illustrations. Using conventional techniques, a maintenance specialist using a laptop computer may switch from one application to another to access supplemental content relating to the maintenance procedure. For example, a maintenance specialist may manipulate a track pad to control a cursor or pointing mechanism to close or minimize one application that is displaying or presenting a maintenance manual, so that the maintenance specialist can then open a second application to access some supplementary content—for example, a photograph, or video clip. Using the laptop computer, this process will almost certainly require that the maintenance specialist suspend concentrating on the actual maintenance task, in order to manually manipulate the controls of the laptop and its operating system to access the desired content. This process is inefficient, as it will take considerable time, and is error prone in the sense that it causes delays in performing procedures that may be done more accurately and precisely if done sequentially, with minimal delay between individual steps.

Another shortfall with conventional techniques involves reporting. In many instances and with many types of equipment, such as aircraft, whenever a maintenance procedure is performed, the maintenance procedure must be properly documented via a report. Typically, the maintenance specialist will generate a report at some time subsequent to when the maintenance specialist completed the maintenance procedure. Accordingly, to the extent that the report is to include a description of what was actually done by the maintenance specialist, the maintenance specialist will generally have to recall from his or her memory the exact tasks that were performed, and the specific parts that might have been involved. Using conventional reporting techniques, not only is the reporting process time consuming for the maintenance specialist, but the reporting process may be prone to errors resulting from the maintenance specialist's inability to remember precisely what was done, what parts were involved, and so forth.

Embodiments of the present invention provide a variety of improvements over conventional techniques and the prior art. First, one aspect of certain embodiments of the present invention involves using a document viewing application to display an enhanced electronic document via a head-mounted display of a wearable computing device. In this context, a head-mounted display is a display that is frequently used in conjunction with a wearable computing device that may have a transparent display capable of reflecting projected images while also allowing the end-user to see through the display to view and focus on his or her surroundings. A head-mounted display may be included with a body-worn computing device, and specifically, a head-worn computing device. By using a head-mounted display in conjunction with a wearable computing device, one advantage of certain embodiments of the present invention is the ability of a maintenance specialist to control and navigate the presentation of content—for example, the enhanced electronic document—in a hands-free manner, without needing to reposition him or herself to operate the computing device. This increases the overall efficiency with which maintenance procedures can be performed, because the maintenance specialist can very quickly toggle his mental focus between the enhanced electronic document (viewed through the head-mounted display), and the equipment that is being maintained.

A second aspect of various embodiments of the present invention that provide advantages over the prior art involves enhancing an electronic document, representing a version of a maintenance manual, with an interactive workflow. For instance, with some embodiments, an electronic document is enhanced by adding to the original content of the document a set of checklist items that are positioned within the original content proximate to certain instructions with which a checklist item corresponds. Accordingly, when a maintenance specialist has completed a particular task or set of tasks described in the original content of the document, an interactive checklist item corresponding with the task or tasks can be marked as complete to indicate completion of the task or tasks. Accordingly, the workflow provides a mechanism by which the completion of tasks can be documented and verified. Additionally, with some embodiments, the workflow is a mechanism by which the order of performance of tasks can be enforced. For instance, with some embodiments, a certain checklist item might be configured such that it can only be marked as having been completed if one or more other checklist items have already been marked complete. Accordingly, as compared with conventional electronic documents, the enhanced electronic documents that include workflows prevent mistakes that might occur when a maintenance specialist inadvertently forgets to perform a particular task, and/or performs one or more tasks out of order.

Another advantageous aspect of some embodiments of the present invention involves providing the maintenance specialist with quick and easy access to supplementary content—that is, content beyond that included in the original maintenance manual as provided by an equipment manufacturer. For example, with some embodiments, when a maintenance specialist selects a particular checklist item, the user interface in which the electronic document is being presented may include one or more selectable multimedia content items (e.g., audio clips, video clips, photographs or graphic images) that are displayed in a portion of the user interface. The maintenance specialist may select one or more multimedia content items for playback or presentation using a particular spoken command (e.g., "play video one" or "show photograph two"). The content items that are presented for selection and playback are dynamically updated as the maintenance specialist selects different checklist items during the maintenance procedure. As such, the multimedia content items will be relevant to the tasks currently being performed by the maintenance specialist.

Another advantageous aspect of some embodiments of the present invention involves integrated reporting procedures. For example, with some embodiments, as a maintenance specialist sequentially works his or her way through a series of instructions set forth in an enhanced electronic document, the maintenance specialist may be prompted to provide or capture some input for subsequent use in generating a report. For instance, the maintenance specialist, upon marking a particular checklist item as having been completed, may be prompted to take a photograph, or capture a video clip, showing the equipment or part for which a maintenance procedure has been completed. To capture a photograph or video clip, the maintenance specialist may simply speak an audible command (e.g., "take photo" or "take video") to invoke or otherwise trigger a procedure to capture the photograph or video clip via an image sensor or image sensing device mounted on a head-worn computing device. With some embodiments, the head-worn computing device may have an operational mode that has a continuous video capturing function, such that an entire maintenance procedure will be captured. With some embodiments, the image sensor will continuously capture video, but only some smaller portion of video will actually be stored. For example, when a maintenance specialist marks a particular checklist item as having been completed, some duration (e.g., 30 seconds) of the video clip preceding the moment the checklist item was marked complete is stored for subsequent reporting, along with some duration (e.g., 30 seconds) of video captured subsequent to when the maintenance specialist marked the checklist item as completed. With some embodiments, a particular checklist item may be configured such that it cannot be marked as having been completed until the maintenance specialist has captured a photograph or video clip to serve as evidence that a particular maintenance procedure was completed. With some embodiments, the maintenance specialist may record spoken commentary or notes, which are translated from speech to text, to include in a report that is generated subsequent to completion of the maintenance procedure. The captured photos, videos and spoken commentary are stored in association with the active checklist item—that is, the most recently selected checklist item, so that during a report generating process, the evidentiary information can easily be linked to the appropriate portion of a generated report. Other aspects of the present inventive subject matter are described below in connection with the description of the various figures.

Figure 2A:
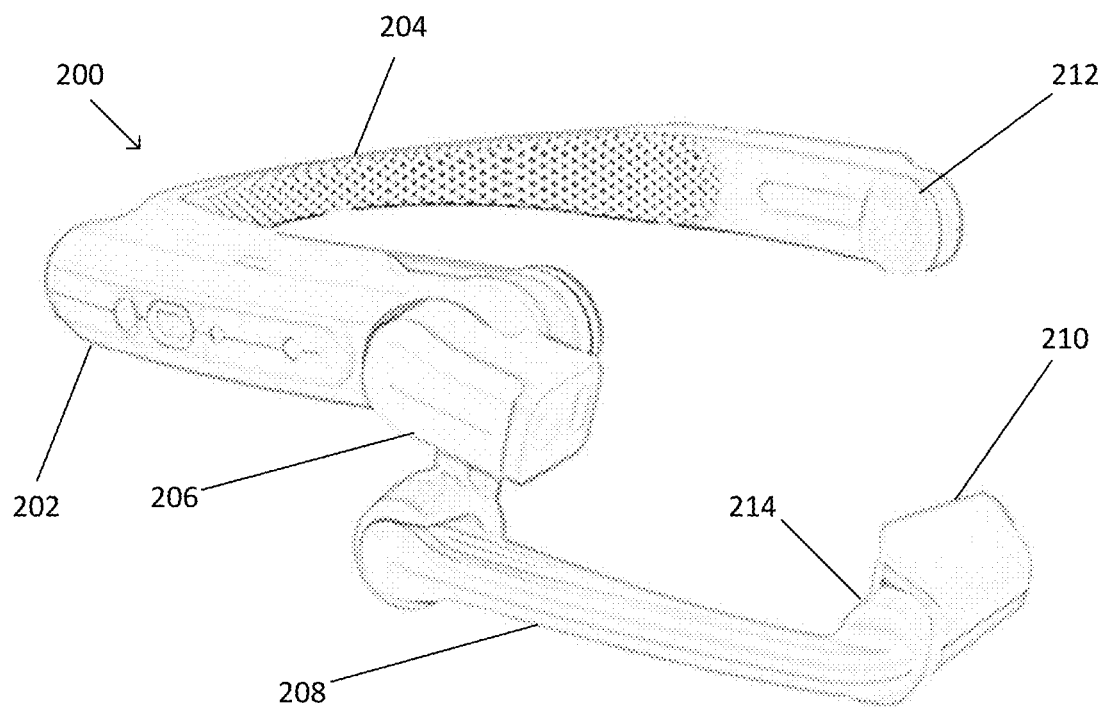
FIGS. 2A and 2B illustrate two examples of head-worn computing devices, each having a head-mounted display for presenting documents and receiving hands-free input, consistent with embodiments of the present invention.
Figure 2B:

FIGS. 2A and 2B illustrate two examples of head-worn computing devices having head-mounted displays for presenting electronic documents and receiving hands-free input from an end-user to navigate such documents, consistent with embodiments of the present invention. The head-worn computing device 200 of FIG. 2A includes a computer housing 202 that is part of a head support arm 204. When wearing the device 200, the head support arm 204 wraps around the back portion of a person's head at or just above the ears. At one end of the head support arm 204 is an image sensor 206 capable of capturing still photographs as well as video. A display 210 and sound sensor (e.g., a microphone) 214 are mounted on a display boom 208 that extends from the head support arm 204. In this example the display 210 is mounted forward from where a person's right eye would be when wearing the device 200. The head-worn computing device 200 additionally includes a speaker 212. Although not shown in FIG. 2A, the head-worn computing device 200 includes a rechargeable battery to provide for mobility. In addition, the head-worn computing device of FIG. 2A may include one or more end-user controls (e.g., buttons, switches, dials, and/or joysticks) providing the wearer with control over various features and functions. For example, such controls may enable powering the device on/off, manipulating aspects of the user interface presented via the display, adjusting volume levels, adjusting the brightness of the display, and so forth.

The head-worn computing device 200 of FIG. 2A is just one example of a particular form factor of a device consistent with embodiments of the invention. However, the present invention is by no means limited to any one particular form factor. FIG. 2B illustrates a head-worn computing device 220 having a form factor similar to conventional eyeglasses, sometimes referred to as smart glasses. Although not shown, with some embodiments, a head-mounted display may be combined with a head-worn computing device having a form factor consistent with a protective helmet. Of course, other form factors are possible and entirely consistent with embodiments of the invention as described herein. In various embodiments, the head-mounted display may have varying positions relative to the wearer's eye or eyes. For example, with some embodiments, the display may be mounted forward of the right eye, while in other embodiments, the display may be mounted forward of the left eye. Similarly, with some embodiments, the display may be mounted slightly underneath, above, or to one side of a particular eye. Consistent with some embodiments, the computing device may not be a body-worn computing device, but a mobile computing device such as a mobile phone or tablet computing device. With such devices, user input may be received via a combination of spoken commands and/or interactions with a touch screen display. Although such devices may not provide completely hands-free operation, many of the advantages of the inventive subject matter will still apply.

Referring again to the head-worn computing device in FIG. 2A, the display 210 presents various user interfaces to the maintenance specialist wearing the device. To navigate the various user interfaces, a maintenance specialist uses a combination of spoken commands (received via the sounds sensor 214) and/or head or eye movements. For instance, with some embodiments, the device may utilize a technique that is commonly referred to as head tracking. Head tracking is a technique that utilizes a variety of sensors (e.g., accelerometer, gyroscope, and/or compass) for determining, monitoring and tracking the position and orientation of an end-user's head. With head tracking, the person wearing the device can make subtle movements with his or her head to manipulate the user interface shown on the head-mounted display 210, for the purpose of selecting objects presented via the user interface. Alternatively, with some embodiments, other sensors (e.g., infrared sensors) may be utilized to perform eye tracking. With eye tracking, an end-user can manipulate the user interface to select objects by simply looking at the objects that are presented on the display. Applications of these techniques are described in greater detail below in connection with the descriptions of FIGS. 4 and 5.

Figure 3:
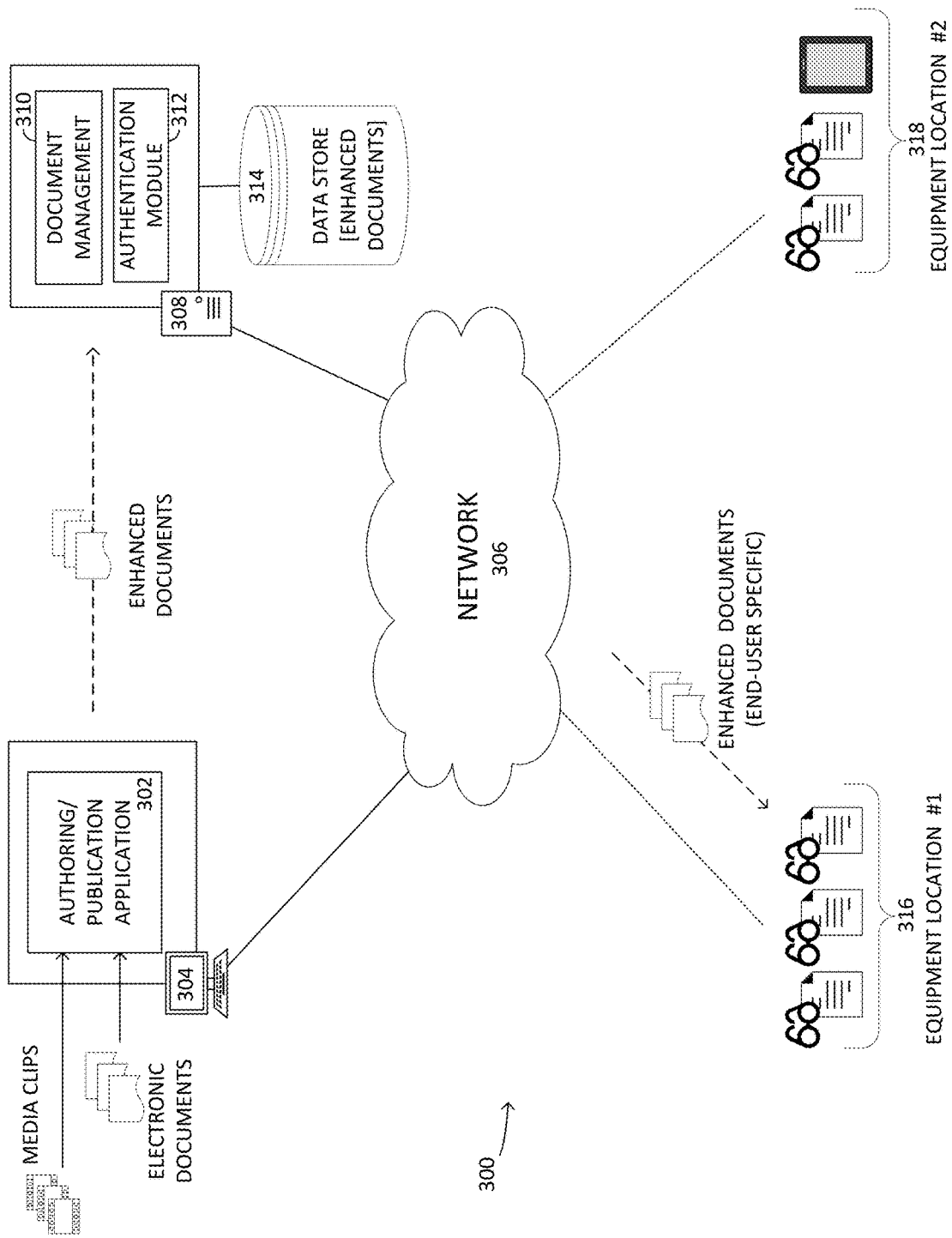
FIG. 3 is a diagram illustrating an example of a computer networking environment including various computer network-based applications and services for use in facilitating development and deployment of enhanced electronic documents and associated content, for consumption via mobile computing devices that operate in a hands-free mode to improve one's ability to perform maintenance procedures, consistent with various embodiments of the present invention.

FIG. 3 is a diagram illustrating an example of a computer networking environment 300 including various computer network-based applications and services for use in facilitating the development and deployment of enhanced electronic documents, consistent with various embodiments of the present invention. As illustrated in FIG. 3, there is an authoring and publication application 302 executing on a first computing device (e.g., a desktop or workstation computer) 304, connected by means of a network 306 to a second computing device 308. The second computing device 308 includes a document management application 310, an authentication module 312, and a document data store 314.

Consistent with some embodiments of the invention, an end-user of the authoring and publication application 302 will use the application to enhance or augment one or more electronic documents, and in some instances, associate various multimedia clips (e.g., video clips, audio clips, photographs, and/or graphical images) with certain pages, portions or sections of an electronic document. Generally, the authoring and publication application 302 takes as input an electronic document that may have a combination of text and illustrations describing a maintenance procedure for a particular piece of equipment, or perhaps a particular part, or portion of equipment. Consistent with some embodiments, when original maintenance manuals are only provided as printed documents, as part of the authoring and publication process, original maintenance manuals may first be converted to electronic documents, e.g., by scanning the documents. An electronic document may be in any of a number of compatible formats, including but by no means limited to: portable document format (PDF), formats consistent with Microsoft Word®, Excel®, or PowerPoint® (e.g., .doc, .docx, .xls, .xlsx., .ppt, or .pptx), and Rich Text Format (RTF). Using the authoring and publication application 302, an end-user of the application 302 will augment the existing electronic document, representing the original maintenance manual, with a workflow consisting of a set of interactive checklist items that can be marked as complete as the maintenance specialist performs the various tasks described in the electronic document.

With some embodiments, each checklist item may be associated with supplemental multimedia content (e.g., audio clips, video clips, photographs, graphic images, etc.). Additionally, during the publication process, meta-data may be generated and associated with the enhanced electronic document, generally, and in some instances, the various checklist items specifically, such that, when a document viewing application is used to view the enhanced electronic document, a checklist item may be navigable subject to certain conditions as determined by the meta-data. For example, with some embodiments, the meta-data associated with an electronic document may require that one or more checklist items be completed in a particular order. Similarly, with some embodiments, the meta-data associated with an electronic document may require the maintenance specialist to provide some input for use in reporting, prior to marking a particular checklist item as having been completed, or, immediately subsequent to marking a particular checklist item as having been completed. For example, the maintenance specialist may be required to capture a photograph or video clip of some portion of equipment subject to a maintenance procedure, prior to a checklist item associated with the maintenance procedure being marked as having been completed. Similarly, with some embodiments, a maintenance specialist may be required to capture a measurement, for example, from the equipment being maintained, or, using some variety of digital instrument or hand tool that can convey digital information representing the measurement or reading to the head-worn computing device via a wired or wireless connection.

The checklist items will generally correspond with and be presented proximate to a particular instruction, or set of instructions, and illustration(s) as presented in the original electronic document. The checklist items are interactive in the sense that a checklist item can be selected by the maintenance specialist. This may be achieved, for example, via the maintenance specialist speaking a particular command (e.g., "go to step one"). When a particular checklist item has been selected, the user interface will indicate as much, for example, by modifying the presentation of the selected checklist item in some way. With some embodiments, upon selecting a particular checklist item, some portion of the user interface of the document viewing application will present selectable content for playback by the maintenance specialist. For example, with some embodiments, the selectable content may be an audio or video clip, such that selection of the audio or video clip will cause the audio or video clip to be played for the maintenance specialist. Spoken commands allow the maintenance specialist to navigate or control the playback of the audio or video clip, for example, by pausing playback, increasing or decreasing the speed of playback, and/or skipping forward or backward in time. In the case of a video clip, the video clip may be presented to the maintenance specialist via the user interface of the document viewing application as presented in the head-mounted display, either overlaying the electronic document, or within a separate pop-up window. In some instances, the selectable content may be a photograph or graphical image. When the maintenance specialist navigates to a new checklist item, the selectable content is automatically and dynamically updated to correspond with the particular instructions or tasks corresponding with the newly selected checklist item.

Consistent with some embodiments, after a document has been enhanced using the authoring and publication application 302, the enhanced document is then published, over the network 306, to a document management application 310. At the document management application 310, each enhanced electronic document is associated with end-user access privileges that determine which end-users are authorized to access the documents. For example, in some instances, various maintenance specialists receive training on maintenance procedures for certain equipment. Based on the received training that a maintenance specialist has received, the maintenance specialist will be granted access privileges to those documents that describe the maintenance procedures associated with the training the maintenance specialist has received. These access privileges for various maintenance specialists may be stored in a database, or similar, and may be accessible locally on a mobile computing device, or, remotely via a network. Accordingly, the document management module 310 of server computer 308 allows an end user to manage the various access privileges that each maintenance specialist has with respect to the various enhanced electronic documents. With some embodiments, an authentication module 312 is used to enforce access privileges, to ensure that only those maintenance specialists who have been authorized to view certain enhanced electronic documents are able to gain access to the documents.

While shown in FIG. 3 as two separate computing devices (e.g., with reference numbers 304 and 308), in alternative embodiments a single computing device may execute an application to author, publish and manage the electronic documents, as well as a document management application and authentication module or service. Furthermore, with some embodiments, each individual head-worn computing device may locally enforce access privileges, as described in greater detail below in connection with the descriptions of FIGS. 4 and 5.

As illustrated in FIG. 3, a maintenance specialist who may be located remotely from the server 308 can request and obtain electronic documents over the network 306. For example, by authenticating with the document management service 310, the maintenance specialist will be able to gain access to those enhanced electronic documents to which the maintenance specialist has been granted access privileges. Accordingly, with some embodiments, a client-server architecture is utilized. However, in alternative embodiments, enhanced electronic documents are stored locally on each mobile computing device 316 and 318. Accordingly, electronic documents may be uploaded to a head-worn computing device via a wired or wireless connection. With some embodiments, end-user authentication and enforcement of access privileges occurs locally—that is at, or by, the head-worn computing device.

Figure 4:
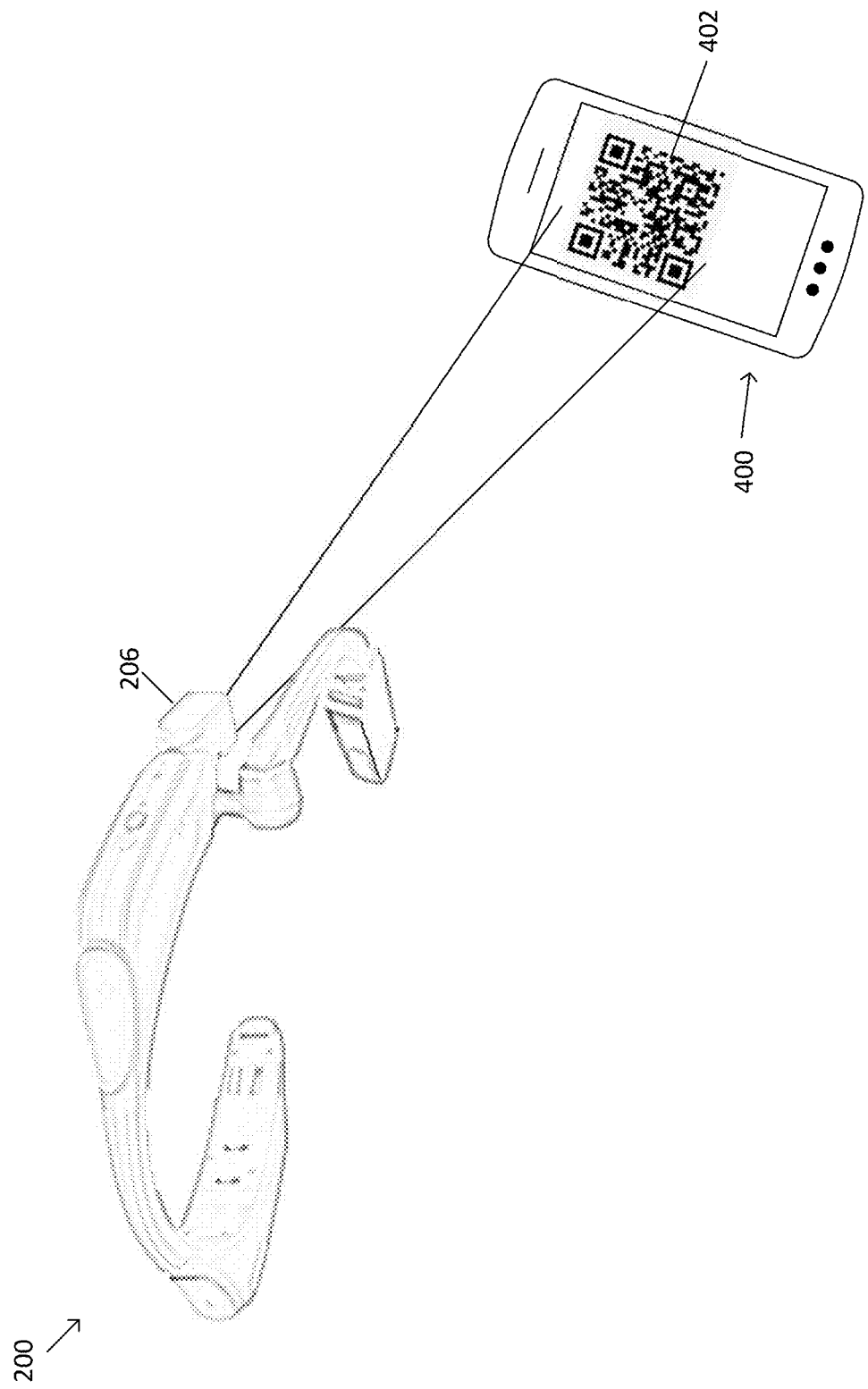
FIGS. 4 and 5 illustrate examples of techniques by which an end-user may perform an authentication operation in order to access a set of enhanced electronic documents associated with equipment the end-user is authorized to maintain, in accordance with some embodiments.
Figure 5:
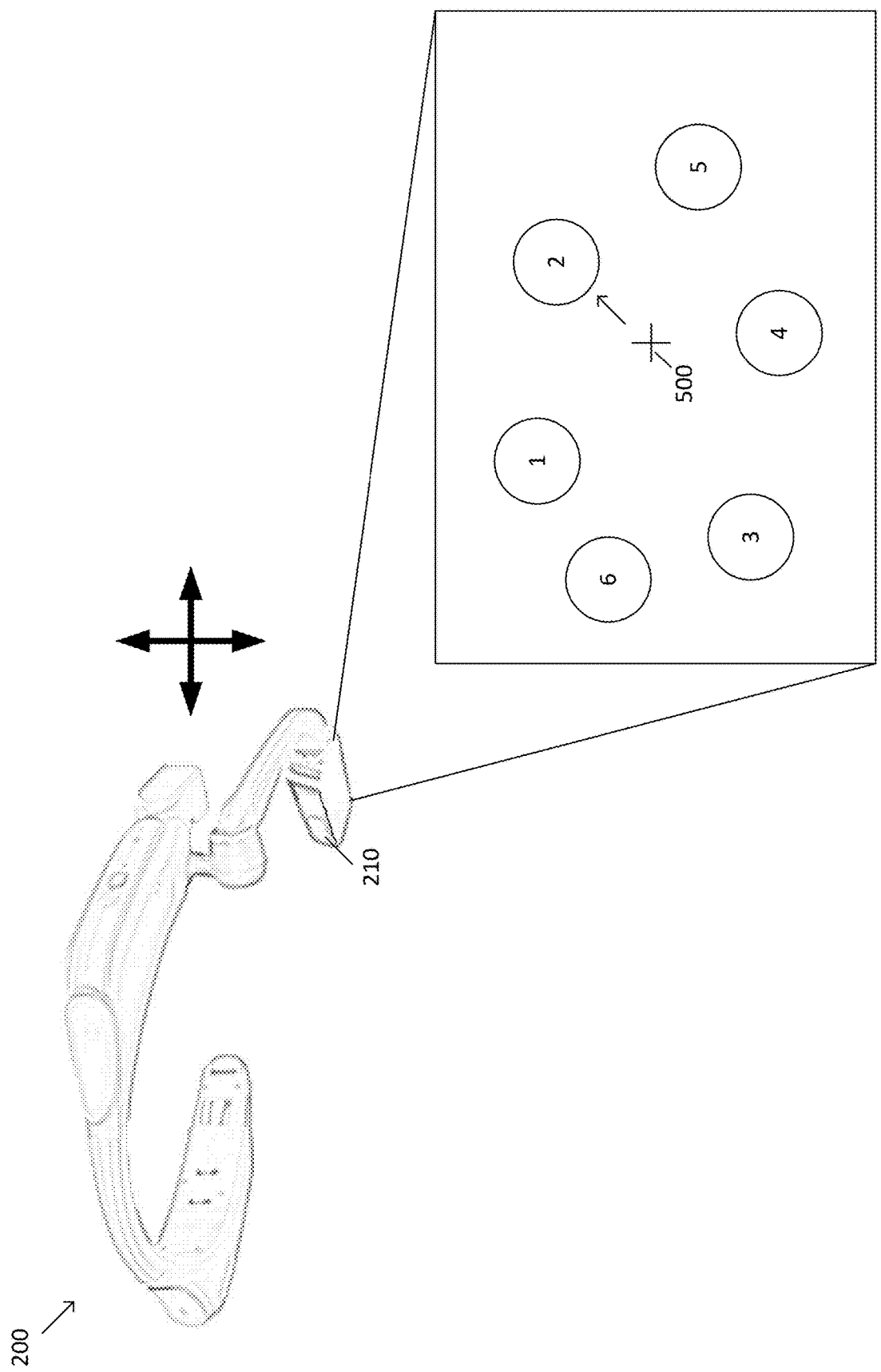

FIGS. 4 and 5 illustrate examples of techniques by which a maintenance specialist may perform an authentication operation in order to access a set of electronic documents associated with equipment the end-user is authorized to maintain, in accordance with some embodiments. As shown in FIG. 4, with some embodiments, a maintenance specialist is provided with a unique symbol or code, such as a barcode or QR (Quick Response) code 402, that uniquely identifies the maintenance specialist. Such a code is equivalent to a username. The maintenance specialist may use an application executing on a mobile phone or similar mobile computing device 400 to access and display his or her unique code. In order to authenticate and establish access to a particular set of maintenance manuals, the maintenance specialist will scan his or her unique code using the image sensor 206 of the head-worn computing device. After the head-worn computing device 200 obtains the code, the obtained code is then compared to a securely stored code known to be associated with the maintenance specialist. When the codes match, the maintenance specialist is provided access to a set of locally stored enhanced electronic documents, based on the access privileges associated with the documents. Alternatively, with some embodiments, the unique code obtained by the image sensor 206 may be communicated wirelessly over a network to a server, such as server 308 in FIG. 3, where an authentication service or module 312 will compare the code against some set of known codes to authenticate the maintenance specialist. Upon successful authentication, the server 308 may communicate information to the head-worn computing device 200 to indicate the various enhanced electronic documents that are available to the maintenance specialist.

As illustrated in FIG. 5, with some embodiments, authenticating a maintenance specialist will include not only obtaining a unique identifying code for the maintenance specialist, but also a password or passcode. As shown in FIG. 5, with some embodiments, a passcode or password is obtained by displaying a set of characters on the head-mounted display, and then using head tracking or eye tracking techniques, to allow the maintenance specialist to enter or select a sequence of characters, numbers or symbols. In the example illustrated in FIG. 5, a set of numbers—in this case, the numbers "1," "2," "3," "4," "5" and "6"—are randomly positioned on a user interface presented via the head-mounted display 210. A selection cursor or position indicator ("+"), shown in FIG. 5 with reference number 500, is positioned in the center of the user interface. As the maintenance specialist makes subtle movements of his or her head, the numbers presented in the user interface will change position within the user interface relative to the position indicator 500. For example, as indicated by the arrow 502, a subtle head movement down and to the left will cause the position indicator to move up, and to the right, relative to the number "2.". This will cause the position indicator ("+") to overlap or align with the number, "2". Accordingly, to select a particular number, the maintenance specialist simply moves his or head to align the position indicator 500 with the desired number, and then, when the two are aligned, the maintenance specialist may speak an audible command (e.g., "select"), or press a button, to invoke the selection of the desired number. Alternatively, the selection can be made by simply keeping the position indicator positioned over the number to be selected for some duration of time. The maintenance specialist would repeat this process to indicate a sequence of numbers or characters representing his or her password or passcode. Once the passcode has been obtained, the passcode would be used in an authentication operation, as described above. For instance, the unique code identifying the end-user and the selected password may be communicated over a network to an authentication service, or alternatively, the same may be communicated to a local authentication service executing on the head-worn computing device.

While FIGS. 4 and 5 illustrate one particular example of a technique for authenticating an end-user, a variety of alternative techniques may be utilized consistent with various embodiments of the invention. By way of example, with some embodiments, the maintenance specialist may simply use audible commands to speak the characters that make up his or her password or passcode. The spoken commands are then recognized, using speech to text conversion techniques, to formulate the password or passcode. With some embodiments, one or more biometric verification technologies may be used to identify and authenticate a maintenance specialist. For example, voice recognition techniques may be used to authenticate the maintenance specialist. For example, a maintenance specialist wearing a head-worn computing device may speak a particular word, phrase or sentence, and in response, an algorithm analyzes characteristics of the speaker's voice to determine the identity of the speaker. Consistent with some embodiments, a maintenance specialist may establish his or her identity by scanning a fingerprint using a fingerprint sensor integrated with a mobile computing device, such as one of those illustrated in FIG. 2A or 2B. In other embodiments, an eye scanner may be used to scan the iris, or retina, of the maintenance specialist, for the purpose of identifying and authenticating the maintenance specialist.

Figure 6:
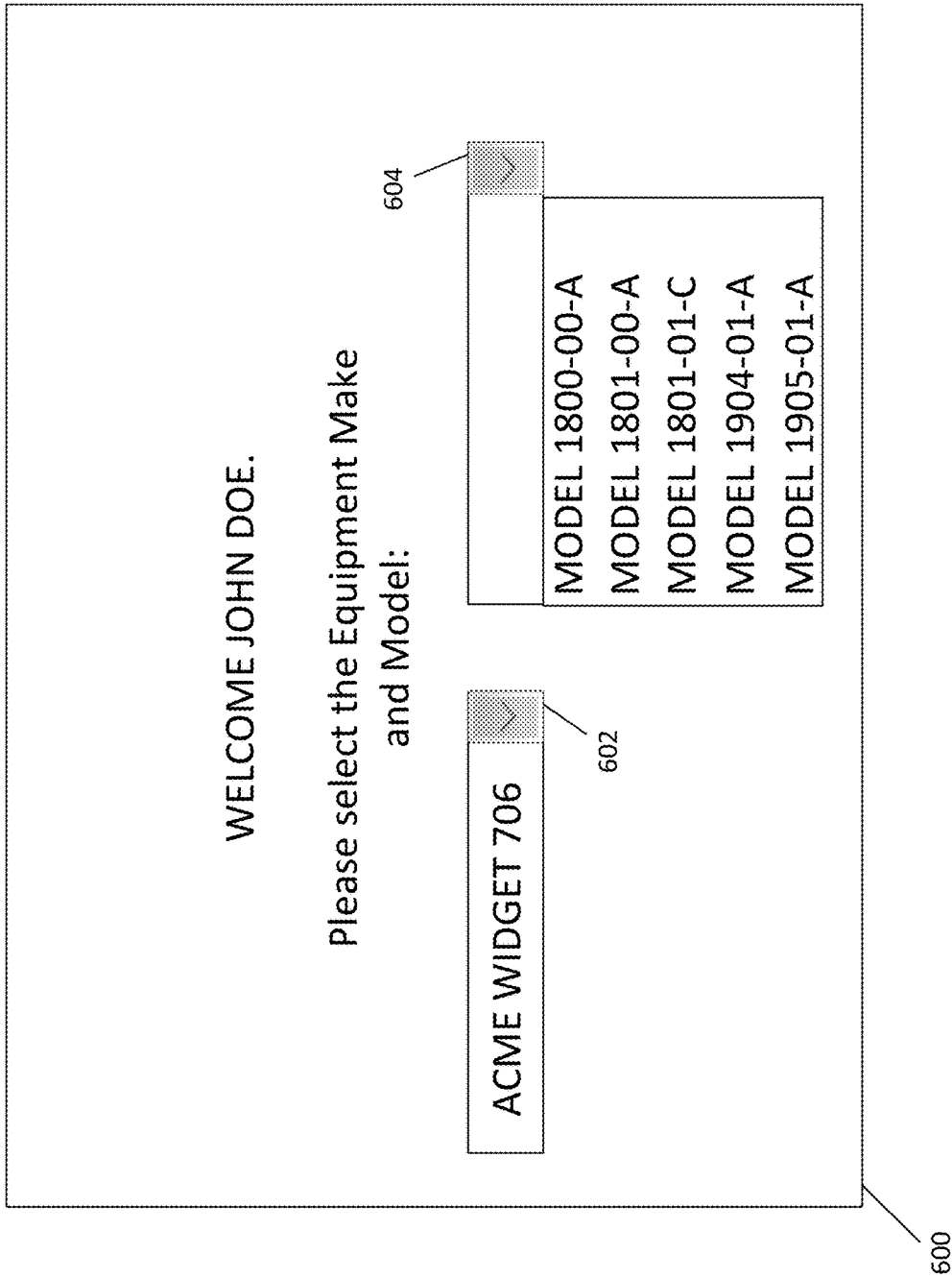
FIG. 6 is a user interface diagram illustrating an example of a user interface presented to an end-user via a head-mounted display, allowing the end-user to select a particular enhanced electronic document associated with a maintenance procedure, in accordance with some embodiments.

FIG. 6 is a user interface diagram illustrating an example of a user interface 600 presented to an end-user via a head-mounted display, allowing the end-user to select a particular electronic document associated with a maintenance procedure, in accordance with some embodiments. As illustrated in FIG. 6, subsequent to the maintenance specialist successfully being authenticated, a user interface is presented to the maintenance specialist. In this example, the user interface includes a pair of drop-down menus that allow the maintenance specialist to select a particular enhanced electronic document that corresponds with a particular piece of equipment, or, a particular maintenance procedure for some specific piece of equipment. With some embodiments, the particular selections presented to the maintenance specialist are determined based on the access privileges associated with the enhanced electronic documents. As such, the maintenance specialist will only be presented with selection options via the drop-down menus for the particular documents corresponding with the maintenance operations and equipment that the maintenance specialist is authorized to maintain, as evidenced by the access privileges. The access privileges may be stored in a database, locally (e.g., at the head-worn computing device), or at a network-connected computing device that is remote from the equipment location. In this example shown in FIG. 6, to make a selection of a particular enhanced electronic document, the maintenance specialist may use spoken commands. As illustrated in FIG. 6, a first drop-down menu 602 corresponds with a selection for a make of equipment, while a second drop-down menu 604 corresponds with a selection for the model of equipment. In various alternative embodiments, other user interface elements beyond drop down menus may of course be used, and the selection options may vary from the just make and model, as shown in FIG. 6.

Figure 7:
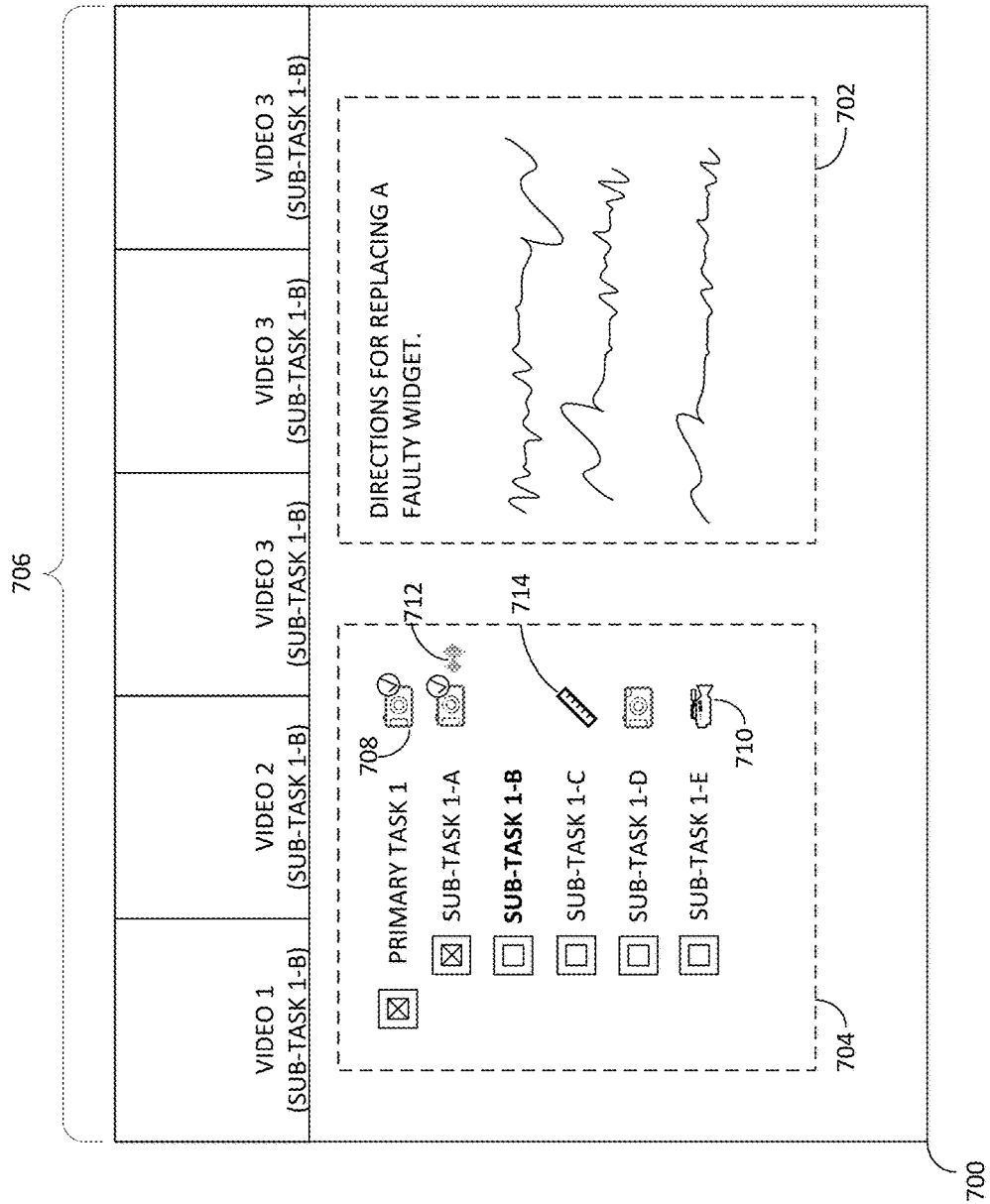
FIG. 7 is a user interface diagram illustrating an example of a user interface presented to an end-user via a head-mounted display and showing an electronic document that has been augmented or enhanced with checklist items that generally correspond with instructions for carrying out a maintenance procedure, according to some embodiments of the present invention.

FIG. 7 is a user interface diagram illustrating an example of a user interface 700 presented to an end-user via a head-mounted display and showing an electronic document that has been augmented with a set of interactive checklist items 704, according to some embodiments of the present invention. As illustrated in FIG. 7, the user interface 700 shows a view of an electronic document having a first portion 702 with a combination of illustrations and instructions for performing a set of tasks associated with an equipment maintenance procedure. In this example, the first portion 702 is original content, e.g., as published with the original maintenance manual for the equipment. The electronic document 700 includes a second portion 704 representing augmented content—that is, content that was added to the original document. In this instance, the augmented content represents a set of interactive checklist items that correspond with the instructions presented in the original content 702.

In addition to the augmented content 704, the user interface shows a selection of multimedia content—in this instance selectable video clips—in a top portion of the user interface with reference number 706. With some embodiments, the multimedia content presented in the top portion 706 of the user interface will correspond with the active or selected checklist item. Accordingly, if the maintenance specialist is currently on the primary task, then the multimedia content, if any, that corresponds with the primary task will be selectable, and therefore playable, by the maintenance specialist. As the maintenance specialist completes the various tasks and marks each checklist item complete, the multimedia content presented in the top portion of the user interface will automatically and dynamically change to correspond with the active checklist item. Associated with each checklist item is a symbol that indicates the status of the task or tasks associated with the checklist item. When the task or tasks for a particular checklist item are completed, the symbol is updated or modified to indicate the change in status. By way of example, in FIG. 7, the symbol is in the form of a box, and when the checklist item is completed, an "X" is shown within the box to indicate the status of the checklist item as complete. As shown in the example user interface of FIG. 7, the currently selected checklist item is "SUB-TASK 1-B," and as such, the video clips presented in the top portion of the user interface 706 are all related to the selected checklist item—in this case, "SUB-TASK 1-B." To play a particular video clip, the maintenance specialist would select a video clip, for example, by simply speaking an audible command (e.g., "play video two"). In this example, the names of both the checklist items and the video clips are generic or general to simply illustrate and convey the concept. However, in various embodiments, specific and descriptive names or titles may be used, allowing the maintenance specialist to easily identify the relevant checklist items and content that are associated with certain tasks and instructions described in the document.

Consistent with some embodiments, the maintenance specialist can use a variety of spoken commands to manipulate the presentation of the electronic document and to navigate the various checklist items. By way of example, spoken commands may facilitate zooming in or out of the document, scrolling up and down within the document, selecting or navigating to various portions (e.g., pages, chapters, sections, and so forth) of the document. With some embodiments, to mark a task as having been completed, the maintenance specialist simply speaks an audible command—for example, "SUB-TASK 1-B complete." In some instances, marking a task complete will automatically activate or select the next checklist item—in this example, "SUB-TASK 1-C." However, in other instances, the maintenance specialist may need to speak a particular command to explicitly move on to the next checklist item. Consistent with some embodiments, the manner in which the various checklist items are navigated will depend upon some metadata associated with the document. For example, the metadata associated with an electronic document may instruct the document viewing application to traverse the checklist items in a particular order, upon each checklist item being marked as complete. Similarly, with some embodiments, the ability to select a next checklist item upon completion of a particular checklist item may be dependent upon the maintenance specialist first capturing a photograph or video clip for use in reporting the completion of the maintenance task associated with the particular checklist item.

As illustrated in FIG. 7, some checklist items may be presented next to or near a special icon or graphic symbol to indicate that the maintenance specialist is required to capture some input for a particular checklist item. For example, for reporting purposes, certain checklist items may be associated with a requirement that a photograph be captured, such that the photograph can be included with a subsequent report. Alternatively, certain checklist items may require that a measurement be acquired, such that some digital information representing the measurement be captured and stored in association with the checklist item. As shown in the example user interface of FIG. 7, the checklist item with name, "PRIMARY TASK" is shown with a special icon 708 to indicate that upon completion of the task associated with the checklist item, the maintenance specialist has captured a photograph as required for the checklist item. With a head-worn computing device, this may be done by invoking a camera function with a spoken command. In some instances, a special icon 710 may indicate that a checklist item requires that a video clip be captured. Similarly, upon capturing a photograph or video clip, the maintenance specialist may, optionally or as a requirement, annotate the captured photograph or video clip with commentary. In some instances, the commentary may be stored as an audio clip and associated with a photograph or video clip. Alternatively, the commentary may be stored as text. This may be achieved by invoking a speech to text annotation function by speaking a particular spoken command. By way of example, the maintenance specialist may annotate a photograph by simply speaking a command, such as, "annotate photo one <pause> this part was replaced as it was broken." As illustrated in the example of FIG. 7, a special icon 712 may be used to indicate that commentary is required, or alternatively, when commentary has been captured and associated with a photograph or video clip, and so forth.

In some instances, a checklist item may require that some type of measurement be made, or that some observation or reading from the equipment be captured. The measurement or observation may be captured by simply obtaining a photograph or video of a measurement reading using some type of measurement tool, or from the equipment itself. For example, the maintenance specialist may use a tool or measuring device (e.g., a pressure gauge, a caliper, a temperature gauge, etc.), and then capture a photograph of the particular measurement reading from the tool or measurement device. Similarly, the equipment being maintained may display some type of measurement reading, such that the measurement reading can be captured in a photograph or video clip by the maintenance specialist using the image sensor of the head-worn computing device. Alternatively, consistent with some embodiments, one or more tools or measuring devices may be connected via a wired connection, or wirelessly (e.g., via WiFi® or Bluetooth®) with the head-worn computing device for the purpose of communicating from the tool or measuring device to the head-worn computing device a measurement reading or value. For example, a sensor integrated with the tool or measuring device may generate digital information representing some type of measurement, which is then communicated to the head-worn computing device and stored in association with a particular checklist item. Examples include but are by no means limited to a wrench that includes a sensor for measuring torque, a pressure gauge, a laser-enabled measurement tool for measuring distance and/or angles, a digital caliper, a voltmeter for measuring voltage, and so forth. With some embodiments, the head-worn computing device may be connected directly to the equipment that is being maintained for the purpose of capturing a measurement, or receiving some other diagnostic information, directly from the equipment. As illustrated in the example of FIG. 7, a special icon 714 may be shown next to a checklist item that is associated with a requirement that the maintenance specialist capture some type of measurement.

Consistent with some embodiments, a checklist item may provide a link (not shown) to another enhanced electronic document representing a maintenance manual for a related maintenance procedure. By way of example, it may be the case that a particular maintenance operation involves multiple maintenance manuals, or that some portion of a maintenance procedure described in one electronic document is subject to another maintenance procedure, described in an alternative maintenance manual. Accordingly, some checklist items may include a reference or link to a separate enhanced electronic document. Selecting the reference or invoking the link will allow the maintenance specialist to open a separate enhanced electronic document and complete some related maintenance procedure before returning to the first electronic document. Accordingly, the workflows associated with the enhanced electronic documents serve to not only enforce an order of operations for the maintenance tasks associated with a single maintenance manual, but the workflows can also facilitate the ordered execution of maintenance procedures across multiple maintenance manuals.

Figure 8:
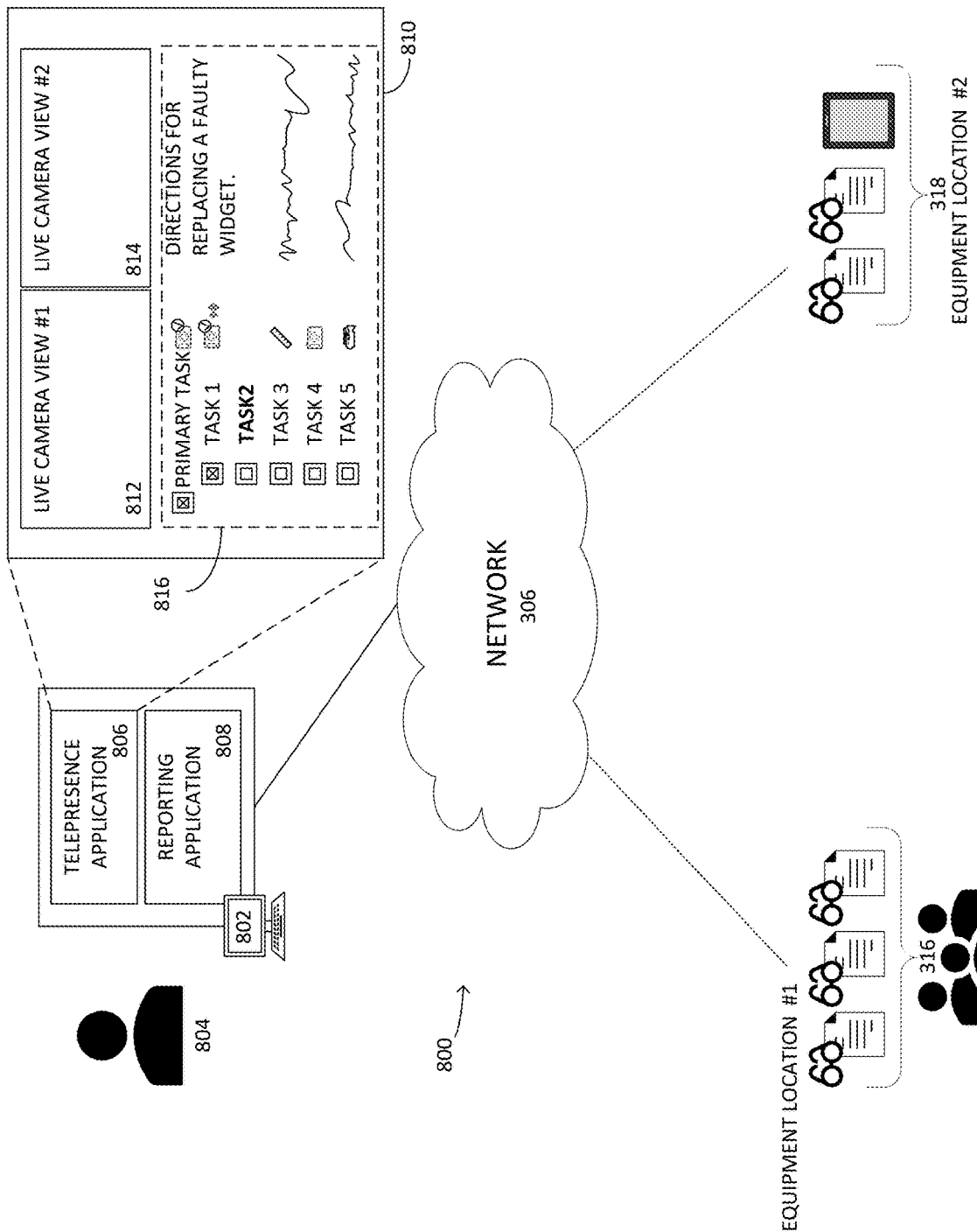
FIG. 8 is a diagram illustrating an example of a computer networking environment including various computer network-based applications and services for providing telepresence and reporting services, consistent with various embodiments of the present invention.

FIG. 8 is a diagram illustrating an example of a computer networking environment 800 including various computer network-based applications and services for providing telepresence and reporting services, consistent with various embodiments of the present invention. As shown in FIG. 8, a network-connected computing device (e.g., a desktop or workstation computer) 802 is executing a telepresence application 806 and a reporting application 808. As described below, the telepresence application allows a special type of communication session between on-site maintenance specialists and one or more remote maintenance specialists. Specifically, during a telepresence session, the remote maintenance specialist is able to view live video streams generated by the image sensing devices of the head-worn computing devices worn by the on-site maintenance specialists and communicate with the on-site maintenance specialists. This allows the remote maintenance specialist with a view of the equipment on which maintenance operations are being performed, as if he or she were present at the equipment location.

Consistent with some embodiments, a telepresence session may be invoked by either a remote maintenance specialist 804, or an on-site maintenance specialist 316. In the example shown in FIG. 8, one of a team of maintenance specialists 316 operating a head-worn computing device 200 at a first location (e.g., equipment location #1), can invoke a telepresence application on his or her head-worn computing device to be connected with the remote maintenance specialist 804, via the computing device with reference number 802. Accordingly, the computing device 802 will have the necessary components and peripherals (e.g., microphone, speaker, display, etc.) to support video-based conferencing or telepresence sessions. When a telepresence session is first invoked, information may be communicated between the various computing devices to provide contextual information so that the telepresence application 806 can generate an appropriate user interface. For example, with some embodiments, when an on-site maintenance specialist 316 first invokes a telepresence session, information indicating the active or selected checklist item will be communicated to the telepresence application 806, with a request to initiate the telepresence session. The telepresence application 806 can then use the received information to determine the electronic document that is currently being presented via the head-mounted display of the head-worn computing device of the on-site maintenance specialist. Accordingly, the user interface 810 of the telepresence application may include the same or similar view of the electronic document, as that being presented to the on-site maintenance specialist. Additionally, the user interface 810 of the telepresence application may allow the remote maintenance specialist to select and view one or more live video streams from the head-worn computing devices of the on-site maintenance specialists. As shown in the example of FIG. 8, the example user interface 810 is currently presenting a view of two live video streams 812 and 814. With some embodiments, the remote maintenance specialist may be able to select content to present on a user interface of the head-worn computer being worn by the on-site maintenance specialist. Similarly, the remote maintenance specialist may be able to use the telepresence application to annotate the presentation of content that is being viewed by the on-site maintenance specialist.

As illustrated in FIG. 8, the computing device 802 in operation by the remote maintenance specialist includes a reporting application 808. With some embodiments, when a maintenance operation has concluded, a report generating process is invoked to extract or obtain information generated during the maintenance procedure and stored locally on one or more of the mobile computing devices used at the equipment location by the on-site maintenance specialists. Such information may include the date and time the maintenance was performed, the identity of the one or more maintenance specialist who performed the maintenance, and any photographs, videos, and commentary generated during the maintenance procedure. The report generation process may be invoked by the on-site maintenance specialists. In such cases, the information stored on the head-worn computing devices may be communicated over a network 306 to the reporting application 80, which automatically associates the obtained information with the relevant fields to generate a structured report. Alternatively, a remote maintenance specialist may be able to interact with the user interface of the reporting application 808 to initiate a report generating process. Accordingly, the reporting application 808 may communicate over a network one or more request for relevant reporting information to be included in a report that is generated by the reporting application 808.

Consistent with some embodiments, the reporting application 808 may be used for generating reports for both internal and external consumption. For example, under certain scenarios, the reports that are generated are primarily for use by the particular organization that owns, leases, and/or operates the equipment that is subject to maintenance. However, depending upon the nature of the equipment being maintained, the maintenance of the equipment may be subject to certain optional or mandatory reporting rules. As such, with some embodiments, the reporting application 808 is capable of generating reports in various formats that are consistent with various reporting rules of certain governmental agencies and/or administrations, or non-governmental agencies and administrations. The reporting application 808 may also facilitate the submission of reports to these agencies and administrations. Under various scenarios and depending upon the particular equipment that is being maintained, reports may be generated for submission to the Department of Defense (DoD), the Federal Aviation Administration (FAA), the Food and Drug Administration (FDA), or their equivalents in one or more foreign countries. With some embodiments, the reporting application 808 includes a report template manager that allows for new report templates to be easily added to the application to support a wide variety of different reports.

Figure 9:
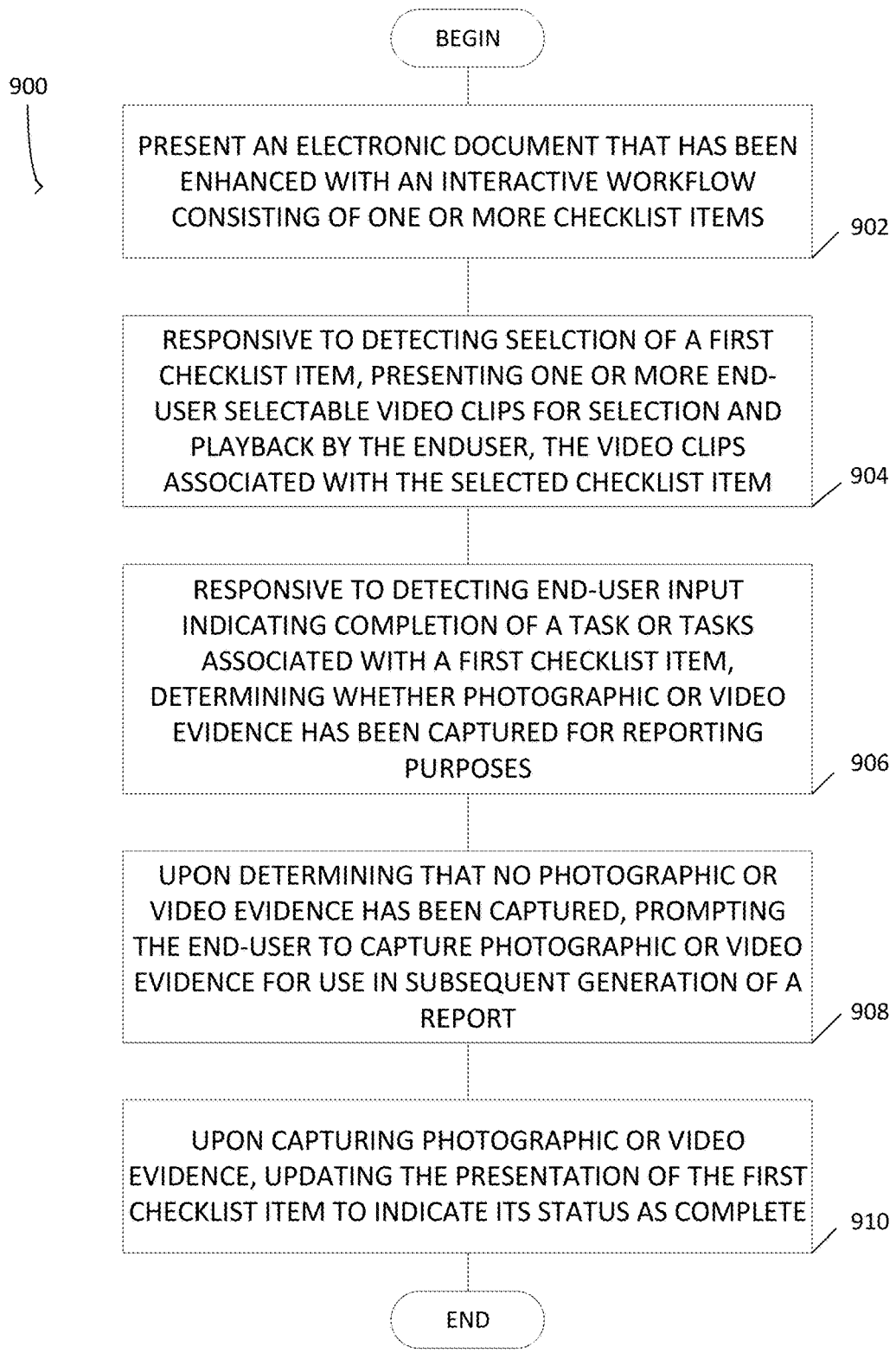
FIG. 9 is a flow diagram illustrating method operations for publishing and then presenting, via a head-mounted display, an augmented or enhanced electronic document that has been augmented with a set of checklist items corresponding to a workflow, in accordance with some embodiments of the present invention.

FIG. 9 is a flow diagram illustrating method operations for presenting, via a head-mounted display, an electronic document that has been augmented with a set of checklist items. The method begins at operation 902 when an enhanced electronic document is presented via a document viewing application executing on a head-worn computer having a head-mounted display. The original content of the electronic document has been enhanced to include an interactive workflow consisting of a set of checklist items. Each checklist item corresponds with some task or set of tasks that are described in the electronic document. Using a spoken command, a maintenance specialist selects a first checklist item presented in the enhanced electronic document. Selection of the first checklist item may occur via the maintenance specialist invoking a spoken command, for example, such as "go to step one," or some similar command.

At method operation 904, the spoken command issued by the maintenance specialist is detected (e.g., via a microphone) and the first checklist item is, as a result of being selected by the maintenance specialist, visually noted as the active checklist item. For instance, the presentation of the first checklist item may be modified when it is selected, for example, by presenting text in a different format (e.g., boldened, italicized, increase size, highlighted, different color, etc.). In addition, upon detecting the selection of the first checklist item, the user interface presented via the head-mounted display is updated to include a portion that presents one or more selectable multimedia clips (e.g., such as video clips) for selection and playback by the maintenance specialist. The video clips that are presented correspond with the selected (e.g., active status) checklist item. As such, if the maintenance specialist would like supplementary instructions—beyond what is presented in the original content of the electronic document—the maintenance specialist can select one of the various multimedia content items, and the selected content item will be presented via the head-mounted display.

After completing the task or tasks associated with the first checklist item, the maintenance specialist may speak an audible command to indicate that the first checklist item should be marked as having been completed. When this spoken command is detected, e.g., at method operation 906, the document viewing application may check to determine whether the maintenance specialist has captured a photograph or video clip for purposes of reporting the completion of the maintenance task. Accordingly, at method operation 908, it is determined that no such photo or video has yet been captured, and thus the maintenance specialist is prompted to capture a photograph or video. Finally, when the maintenance specialist has captured a photograph or video clip for reporting purposes, at method operation 910, the presentation of the first checkmark item is updated to indicate that the task or tasks associated with the checkmark item have successfully been completed by the maintenance specialist.

Modules, Components, and Logic

Certain embodiments are described herein as including a number of components, modules, or mechanisms. Modules may constitute either software modules (e.g., code embodied on a machine-readable medium or machine-readable storage device) or hardware modules. A "hardware module" is a tangible unit capable of performing certain operations and may be configured or arranged in a certain physical manner. In various example embodiments, one or more computer systems or devices (e.g., a standalone computer system, a client computer system, or a server computer system) or one or more hardware modules of a computer system or device (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a FPGA or an ASIC. A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Example Machine Architecture and Machine-Readable Medium

Figure 10:
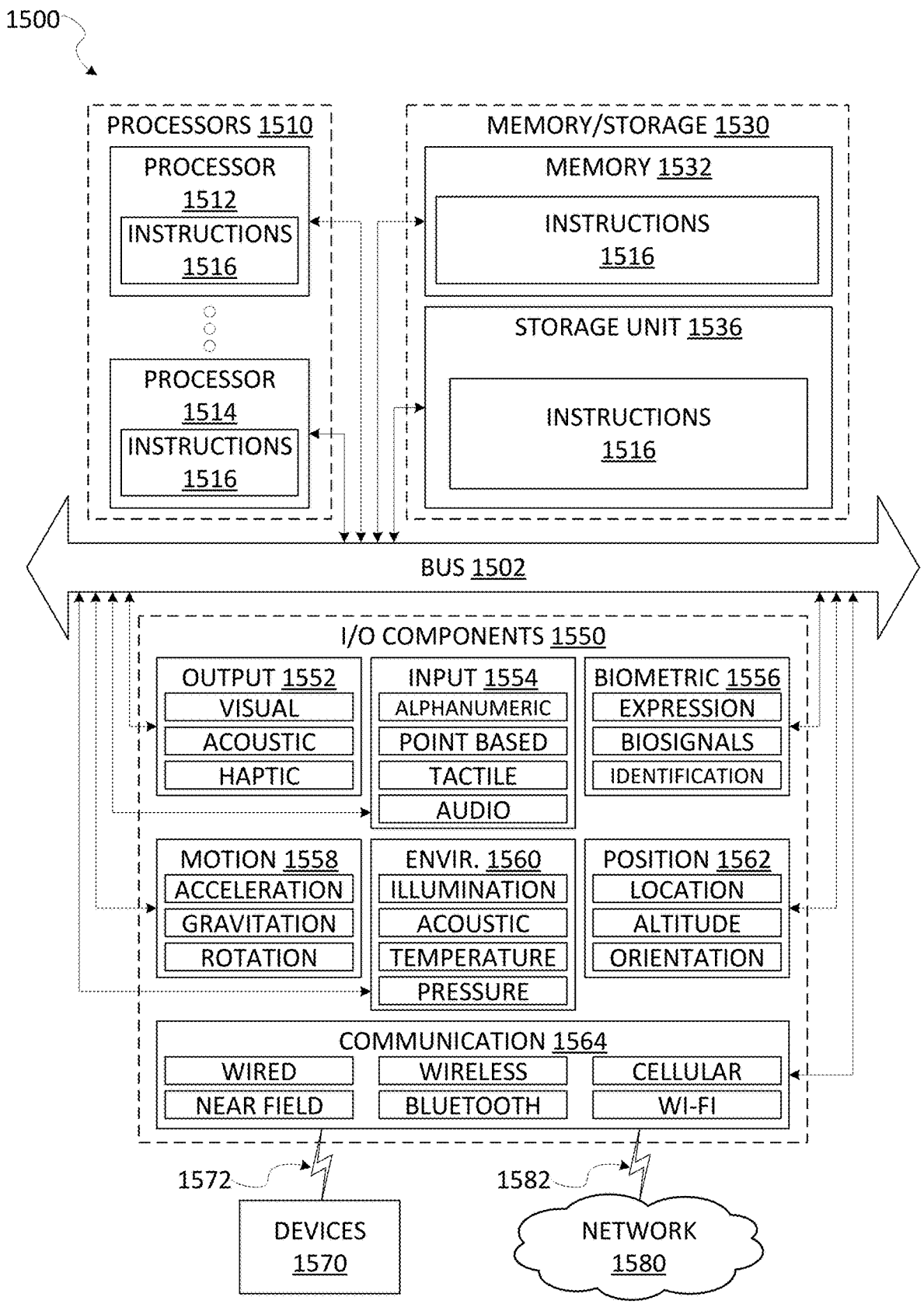
FIG. 10 is a block diagram illustrating components of a machine, according to some example embodiments, able to read instructions from a machine-readable medium (e.g., a machine-readable storage medium or machine-readable storage device) and perform any one or more of the methodologies discussed herein.

FIG. 10 is a block diagram illustrating components of a machine 1500, according to some example embodiments, able to read instructions from a machine-readable medium (e.g., a machine-readable storage medium or machine-readable storage device) and perform any one or more of the methodologies discussed herein. Specifically, FIG. 10 shows a diagrammatic representation of the machine 1500 in the example form of a computer system or device, within which instructions 1516 (e.g., software, a program, an application, an applet, an app, or other executable code) for causing the machine 1500 to perform any one or more of the methodologies discussed herein may be executed. For example, the instructions 1516 may cause the machine 1500 to execute the flow diagram of FIG. 8. Additionally, or alternatively, the instructions 1516 may implement one or more of the devices or systems illustrated in one of FIG. 2A, 2B or 3.

The instructions 1516 transform the general, non-programmed machine 1500 into a particular machine 1500 programmed to carry out the described and illustrated functions in the manner described. In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a PDA, or any machine capable of executing the instructions 1516, sequentially or otherwise, that specify actions to be taken by machine 1500. Further, while only a single machine 1500 is illustrated, the term "machine" shall also be taken to include a collection of machines 1500 that individually or jointly execute the instructions 1516 to perform any one or more of the methodologies discussed herein.

The machine 1500 may include processors 1510, memory/storage 1530, and I/O components 1550, which may be configured to communicate with each other such as via a bus 1502. In an example embodiment, the processors 1510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, processor 1512 and processor 1514 that may execute the instructions 1516. The term "processor" is intended to include multi-core processor that may comprise two or more independent processors (sometimes referred to as "cores") that may execute instructions 1516 contemporaneously. Although FIG. 10 shows multiple processors 1510, the machine 1500 may include a single processor with a single core, a single processor with multiple cores (e.g., a multi-core processor), multiple processors with a single core, multiple processors with multiples cores, or any combination thereof.

The memory/storage 1530 may include a memory 1532, such as a main memory, or other memory storage, and a storage unit 1536, both accessible to the processors 1510 such as via the bus 1502. The storage unit 1536 and memory 1532 store the instructions 1516 embodying any one or more of the methodologies or functions described herein. The instructions 1516 may also reside, completely or partially, within the memory 1532, within the storage unit 1536, within at least one of the processors 1510 (e.g., within the processor's cache memory), or any suitable combination thereof, during execution thereof by the machine 1500. Accordingly, the memory 1532, the storage unit 1536, and the memory of processors 1510 are examples of machine-readable media.

As used herein, "machine-readable medium" includes a machine-readable storage device able to store instructions 1516 and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1516. The term "machine-readable medium" shall also be taken to include any medium, or combination of multiple media, that is capable of storing instructions (e.g., instructions 1516) for execution by a machine (e.g., machine 1500), such that the instructions, when executed by one or more processors of the machine 1500 (e.g., processors 1510), cause the machine 1500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 1550 may include a wide variety of components to receive input, provide output, produce output, transmit information, exchange information, capture measurements, and so on. The specific I/O components 1550 that are included in a particular machine will depend on the type of machine. For example, portable machines such as mobile phones will likely include a touch input device or other such input mechanisms, while a headless server machine will likely not include such a touch input device. It will be appreciated that the I/O components 1550 may include many other components that are not shown in FIG. 10. The I/O components 1550 are grouped according to functionality merely for simplifying the following discussion and the grouping is in no way limiting. In various example embodiments, the I/O components 1550 may include output components 1552 and input components 1554. The output components 1552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1554 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1550 may include biometric components 1556, motion components 1558, environmental components 1560, or position components 1562 among a wide array of other components. For example, the biometric components 1556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1558 may include acceleration sensor components (e.g., accelerometer), gravitation sensor components, rotation sensor components (e.g., gyroscope), and so forth. The environmental components 1560 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1562 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1550 may include communication components 1564 operable to couple the machine 1500 to a network 1580 or devices 1570 via coupling 1582 and coupling 1572, respectively. For example, the communication components 1564 may include a network interface component or other suitable device to interface with the network 1580. In further examples, communication components 1564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1570 may be another machine or any of a wide variety of peripheral devices (e.g., a peripheral device coupled via a USB).

Moreover, the communication components 1564 may detect identifiers or include components operable to detect identifiers. For example, the communication components 1564 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF416, Ultra Code, UCC RSS-2D bar code, and other optical codes), or acoustic detection components (e.g., microphones to identify tagged audio signals). In addition, a variety of information may be derived via the communication components 1564, such as location via Internet Protocol (IP) geo-location, location via Wi-Fi® signal triangulation, location via detecting a NFC beacon signal that may indicate a particular location, and so forth.

In various example embodiments, one or more portions of the network 1580 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1580 or a portion of the network 1580 may include a wireless or cellular network and the coupling 1582 may be a Code Division Multiple Access (CDMA) connection, a Global System for Mobile communications (GSM) connection, or other type of cellular or wireless coupling. In this example, the coupling 1582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1516 may be transmitted or received over the network 1580 using a transmission medium via a network interface device (e.g., a network interface component included in the communication components 1564) and utilizing any one of a number of well-known transfer protocols (e.g., hypertext transfer protocol (HTTP)). Similarly, the instructions 1516 may be transmitted or received using a transmission medium via the coupling 1572 (e.g., a peer-to-peer coupling) to devices 1570. The term "transmission medium" shall be taken to include any intangible medium that is capable of storing, encoding, or carrying instructions 1516 for execution by the machine 1500, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure, embodiment, or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

We claim:

1. A wearable computing device comprising:
   an image sensor for capturing still images and video;
   a sensor for capturing spoken commands and audible sound;
   a speaker;
   a head-mounted display;
   a processor;
   a memory storage device for storing instructions, which, when executed by the processor, cause the wearable computing device to perform operations comprising:
   presenting, via the head-mounted display within a first portion of a user interface an electronic document containing a combination of illustrations and text describing a maintenance procedure for a particular piece of equipment, the electronic document augmented with a workflow consisting of a plurality of interactive checklist items, each checklist item associated with one or more tasks to be completed by an end-user for completing the maintenance procedure described in the electronic document and including a symbol that conveys a status of the one or more tasks as complete or incomplete;
   wherein at least one interactive checklist item in the plurality of interactive checklist items is associated with a video clip presented in a second portion of the user interface when the at least one interactive checklist item has been selected by the end-user, the video clip selectable for play back by the end-user via a specific audible command; and
   upon detecting specific input indicating completion of the one or more tasks associated with a particular checklist item, i) updating the particular checklist item as presented in the first portion of the user interface by modifying the symbol included with the particular checklist item to indicate that the one or more tasks associated with the particular checklist item have been completed by the end-user, ii) prompting the end-user to capture a still photo or video clip as evidence of the completion of the one or more tasks associated with the particular checklist item, and iii) preventing selection by the end-user of another checklist item in the workflow until a determination is made that a photo or video has been captured and stored in association with the particular checklist item.

2. The wearable computing device of claim 1, wherein the wearable computing device is a head-worn computing device and the head-mounted display is attached to the wearable computing device to be positioned forward of one or the other eye of the end-user when wearing the head-worn computing device, enabling the end-user to view content presented via the user interface presented via the head-mounted display or the surrounding environment.

3. The wearable computing device of claim 1, wherein each interactive checklist item of the workflow is displayed within the electronic document positioned proximate to some portion of illustrations or text relating to a portion of the maintenance procedure that corresponds with the one or more tasks associated with a respective checklist item.

4. The wearable computing device of claim 1, wherein at least one interactive checklist item in the plurality of interactive checklist items is associated with a primary task and one or more sub-tasks, wherein the primary task and each sub-task are associated with corresponding symbols that convey the status of each respective primary task and sub-task as complete or incomplete;

wherein at least one sub-task is associated with a video clip presented in a second portion of the user interface when the at least one sub-task has been selected by the end-user, the video clip selectable for playback by the end-user via a specific spoken command; and wherein the primary task can be marked as completed via a spoken command only when each individual sub-task has been marked as complete.

5. The wearable computing device of claim 1, wherein the memory storage device is storing instructions, which, when executed by the processor, cause the wearable computing device to perform additional operations comprising:

responsive to detecting specific end-user input, invoking a telepresence session between the wearable computing device and a remote computing device, wherein, as part of the telepresence session, a communication session is established allowing the end-user of the wearable computing device to have an audible conversation with a remote end-user at the remote computing device, and a live video stream captured by the image sensor of the wearable computing device is communicated to the remote computing device for display to the remote end-user.

6. The wearable computing device of claim 1, wherein detecting the specific input indicating completion of the one or more tasks associated with a particular checklist item comprises:

detecting a particular spoken command via the sensor for capturing spoken commands, the particular spoken command indicating completion of the one or more tasks associated with the particular checklist item.

7. The wearable computing device of claim 1, wherein detecting the specific input indicating completion of the one or more tasks associated with a particular checklist item comprises:

detecting that a measurement reading has been received from a sensor of a measuring device that is communicatively coupled with the wearable computing device via a wired, or wireless, connection.

8. A computer-implemented method comprising:

presenting, via a head-mounted display of a head-worn computing device, within a first portion of a user interface an electronic document containing a combination of illustrations and text describing a maintenance procedure for a particular piece of equipment, the electronic document augmented with a workflow consisting of a plurality of interactive checklist items, each checklist item associated with one or more tasks to be completed by an end-user for completing the maintenance procedure described in the electronic document and including a symbol that conveys a status of the one or more tasks as complete or incomplete;

wherein at least one interactive checklist item in the plurality of interactive checklist items is associated with a video clip presented in a second portion of the user interface when the at least one interactive checklist item has been selected by the end-user, the video clip selectable for playback by the end-user via a specific audible command; and upon detecting specific input indicating completion of the one or more tasks associated with a particular checklist item, i) updating the particular checklist item as presented in the first portion of the user interface by modifying the symbol included with the particular checklist item to indicate that the one or more tasks associated with the particular checklist item have been completed by the end-user, ii) prompting the end-user to capture a still photo or video clip as evidence of the completion of the one or more tasks associated with the particular checklist item, and iii) preventing selection by the end-user of another checklist item in the workflow until a determination is made that a photo or video has been captured and stored in association with the particular checklist item.

9. The computer-implemented method of claim 8, wherein the head-mounted display is attached to the wearable computing device so as to be positioned forward of one or the other eye of the end-user when wearing the head-worn computing device, enabling the end-user to view content presented via the user interface presented via the head-mounted display or the surrounding environment.

10. The computer-implemented method of claim 8, wherein each interactive checklist item of the workflow is displayed within the electronic document positioned proximate to some portion of illustrations or text relating to a portion of the maintenance procedure that corresponds with the one or more tasks associated with a respective checklist item.

11. The computer-implemented method of claim 8, wherein at least one interactive checklist item in the plurality of interactive checklist items is associated with a primary task and one or more sub-tasks, wherein the primary task and each sub-task are associated with corresponding symbols that convey the status of each respective primary task and sub-task as complete or incomplete;

wherein at least one sub-task is associated with a video clip presented in a second portion of the user interface when the at least one sub-task has been selected by the end-user, the video clip selectable for playback by the end-user via a specific spoken command; and wherein the primary task can be marked as completed via a spoken command only when each individual sub-task has been marked as complete.

12. The computer-implemented method of claim 8, further comprising:

responsive to detecting specific end-user input, invoking a telepresence session between the wearable computing device and a remote computing device, wherein, as part of the telepresence session, a communication session is established allowing the end-user of the wearable computing device to have an audible conversation with a remote end-user at the remote computing device, and a live video stream captured by the image sensor of the wearable computing device is communicated to the remote computing device for display to the remote end-user.

13. The computer-implemented method of claim 8, wherein detecting the specific input indicating completion of the one or more tasks associated with a particular checklist item comprises:

detecting a particular spoken command via the sensor for capturing spoken commands, the particular spoken command indicating completion of the one or more tasks associated with the particular checklist item.

14. The computer-implemented method of claim 8, wherein detecting the specific input indicating completion of the one or more tasks associated with a particular checklist item comprises:

detecting that a measurement reading has been received from a sensor of a measuring device that is communicatively coupled with the wearable computing device via a wired, or wireless, connection.

15. A mobile computing device comprising:
an image sensor for capturing still images and video;
a sensor for capturing spoken commands and audible sound;
a speaker;
a touch-screen display;
a processor;
a memory storage device for storing instructions, which, when executed by the processor, cause the mobile computing device to perform operations comprising:
presenting, via the touch-screen display within a first portion of a user interface an electronic document containing a combination of illustrations and text describing a maintenance procedure for a particular piece of equipment, the electronic document augmented with a workflow consisting of a plurality of interactive checklist items, each checklist item associated with one or more tasks to be completed by an end-user for completing the maintenance procedure described in the electronic document and including a symbol that conveys a status of the one or more tasks as complete or incomplete;
wherein at least one interactive checklist item in the plurality of interactive checklist items is associated with an icon representing a video clip presented in a second portion of the user interface when the at least one interactive checklist item has been selected by the end-user, the video clip selectable for play back by the end-user; and
upon receiving input indicating completion of the one or more tasks associated with a particular checklist item, i) updating the particular checklist item as presented in the first portion of the user interface by modifying the symbol included with the particular checklist item to indicate that the one or more tasks associated with the particular checklist item have been completed by the end-user, ii) prompting the end-user to capture a still photo or video clip as evidence of the completion of the one or more tasks associated with the particular checklist item, and iii) preventing selection by the end-user of another checklist item in the workflow until a determination is made that a photo or video has been captured and stored in association with the particular checklist item.

16. A wearable computing device comprising:
an image sensor for capturing still images and video;
a sensor for capturing spoken commands and audible sound;
a speaker;
a head-mounted display;
a processor;
a memory storage device for storing instructions, which, when executed by the processor, cause the wearable computing device to perform operations comprising:
authenticating the end-user by:
capturing via the image sensor a code associated with and uniquely identifying the end-user; and
comparing the captured code with an instance of the code known to be associated with the end-user, wherein said instance of the code known to be associated with the end-user is associated with a set of electronic documents corresponding with specific equipment on which the end-user is authorized to perform maintenance procedures;
presenting, via the head-mounted display within a first portion of a user interface an electronic document, selected from the set of electronic documents, containing a combination of illustrations and text describing a maintenance procedure for a particular piece of equipment, the electronic document augmented with a workflow consisting of a plurality of interactive checklist items, each checklist item associated with one or more tasks to be completed by an end-user for completing the maintenance procedure described in the electronic document and including a first symbol that conveys a status of the one or more tasks as complete or incomplete;
upon detecting specific input indicating completion of the one or more tasks associated with a particular checklist item, i) updating the particular checklist item as presented in the first portion of the user interface by modifying the symbol included with the particular checklist item to indicate that the one or more tasks associated with the particular checklist item have been completed by the end-user.

17. The wearable computing device of claim 16, wherein subsequent to authenticating the end-user, selecting for presentation to the end-user a subset of the set of electronic documents corresponding with specific equipment on which the end-user is authorized to perform maintenance procedures.

18. The wearable computing device of claim 16, wherein the memory storage device is storing additional instructions, which, when executed by the processor, cause the wearable computing device to perform operations comprising:
as part of authenticating the end-user, subsequent to capturing the code associated with and uniquely identifying the end-user, receiving end-user input via head tracking and/or spoken commands to obtain a password of the end-user as a series of characters selected from a set of characters presented in a user interface via the head-mounted display; and
comparing the captured series of characters with an instance of a series of characters known to be associated with the code associated with and uniquely identifying the end-user.

19. The wearable computing device of claim 16, wherein detecting specific input indicating completion of the one or more tasks associated with a particular checklist item comprises:
detecting a particular spoken command via the sensor for capturing spoken commands, the particular spoken command indicating completion of the one or more tasks associated with the particular checklist item.

20. The wearable computing device of claim 16, wherein detecting specific input indicating completion of the one or more tasks associated with a particular checklist item comprises:
detecting that a photograph or video clip has been captured via the image sensor.

21. The wearable computing device of claim 16, wherein detecting specific input indicating completion of the one or more tasks associated with a particular checklist item comprises:
detecting that a measurement reading has been received from a sensor of a measuring device that is communicatively coupled with the wearable computing device via a wired, or wireless, connection.

22. A computer-implemented method comprising:
authenticating an end-user of a head-worn computing device by:
capturing via an image sensor of the device a code associated with and uniquely identifying the end-user; and
comparing the captured code with an instance of the code known to be associated with the end-user, wherein said instance of the code known to be associated with the end-user is associated with a set of electronic documents corresponding with specific equipment on which the end-user is authorized to perform maintenance procedures;
presenting, via a head-mounted display of the head-worn computing device, within a first portion of a user interface an electronic document selected from the set of electronic documents, the electronic document containing a combination of illustrations and text describing a maintenance procedure for a particular piece of equipment and augmented with a workflow consisting of a plurality of interactive checklist items, each checklist item associated with one or more tasks to be completed by an end-user for completing the maintenance procedure described in the electronic document and including a symbol that conveys a status of the one or more tasks as complete or incomplete;
upon detecting specific input indicating completion of the one or more tasks associated with a particular checklist item, i) updating the particular checklist item as presented in the first portion of the user interface by modifying the symbol included with the particular checklist item to indicate that the one or more tasks associated with the particular checklist item have been completed by the end-user, ii) prompting the end-user to capture a still photo or video clip as evidence of the completion of the one or more tasks associated with the particular checklist item, and iii) preventing selection by the end-user of another checklist item in the workflow until a determination is made that a photo or video has been captured and stored in association with the particular checklist item.

23. The computer-implemented method of claim 22, wherein subsequent to authenticating the end-user, selecting for presentation to the end-user a subset of the set of electronic documents corresponding with specific equipment on which the end-user is authorized to perform maintenance procedures.

24. The computer-implemented method of claim 22, wherein as part of authenticating the end-user, subsequent to capturing the code associated with and uniquely identifying the end-user, receiving end-user input via head tracking and/or spoken commands to obtain a password of the end-user as a series of characters selected from a set of characters presented in a user interface via the head-mounted display; and
comparing the captured series of characters with an instance of a series of characters known to be associated with the code associated with and uniquely identifying the end-user.

25. The computer-implemented method of claim 22, wherein detecting specific input indicating completion of the one or more tasks associated with a particular checklist item comprises:
detecting a particular spoken command via the sensor for capturing spoken commands, the particular spoken command indicating completion of the one or more tasks associated with the particular checklist item.

26. The computer-implemented method of claim 22, wherein detecting specific input indicating completion of the one or more tasks associated with a particular checklist item comprises:
detecting that a photograph or video clip has been captured via the image sensor.

27. The computer-implemented method of claim 22, wherein detecting specific input indicating completion of the one or more tasks associated with a particular checklist item comprises:
detecting that a measurement reading has been received from a sensor of a measuring device that is communicatively coupled with the wearable computing device via a wired, or wireless, connection.

* * * * *